United States Patent [19]

Task

[11] 4,256,368
[45] Mar. 17, 1981

[54] COLOR CONTRAST SENSITIVITY MEASURING DEVICE

[75] Inventor: Harry L. Task, Montgomery County, Ohio

[73] Assignee: The United States of America as represented by the Secretary of the Air Force, Washington, D.C.

[21] Appl. No.: 110,145

[22] Filed: Jan. 7, 1980

[51] Int. Cl.³ .............. G02B 27/18; G02B 27/28; G03B 27/72; G03B 21/00
[52] U.S. Cl. .............. 350/408; 350/159; 350/407; 353/20; 353/84; 353/121; 355/37; 355/71; 356/403; 356/420
[58] Field of Search .............. 350/147–148, 350/159; 356/403, 405–406, 419–420; 353/20, 84, 121; 355/37, 71, 77; 358/61, 63

[56] References Cited

U.S. PATENT DOCUMENTS

| | | | |
|---|---|---|---|
| 2,123,743 | 7/1938 | Pratt | 353/20 |
| 3,498,705 | 3/1970 | Dove et al. | 355/71 |

FOREIGN PATENT DOCUMENTS 273366  9/1970  U.S.S.R. .............. 356/403

OTHER PUBLICATIONS

Valberg, A., "A Visual Tristimulus Projection Colorimeter", Applied Optics, 1–1971, pp. 8–13.

*Primary Examiner*—John K. Corbin
*Assistant Examiner*—Wm. H. Punter
*Attorney, Agent, or Firm*—Donald J. Singer; Casimer K. Salys

[57] ABSTRACT

An apparatus for generating patterned images which are variable in color contrast and spatial frequency while retaining a substantially constant, uniform level of photometric luminance. Two broad spectrum beams of luminous energy are individually projected through two orthogonally oriented polarizers and interleaved upon being split. The intensity in one beam is homogeneous while the other contains a spatially periodic pattern. The two beams created by splitting and interleaving are selectively color filtered and combined after one is translated sufficiently to reverse its phase relative to the other. A rotating polarizer in the path of the output combined beam alters the pattern color composition between one extreme where the spatially reversing colors are defined by the color filters and the opposite extreme in which the pattern disappears into a uniform composition of the two colors.

4 Claims, 5 Drawing Figures

COLOR CONTRAST SENSITIVITY MEASURING DEVICE

RIGHT OF THE GOVERNMENT

The invention described herein may be manufactured and used by or for the Government of the United States for all governmental purposes without the payment of any royalty.

BRIEF SUMMARY

The present invention is directed to an apparatus for generating patterned images whose color distribution, in terms of composition and spatial frequency, can be altered without substantially varying the uniformity of the photometric luminance across the image. Two separate means provide beams of broad spectrum luminous energy. One of the two beams is altered to have a pattern of spatially varying luminous intensity by interposing a variable contrast pattern. Then, individual linear polarizers establish polarizations in each beam, which polarizations are preferably orthogonal. A beam splitter divides each such polarized beam into substantially equivalent portions, which, upon being interleaved, appear on two distinct optical axes. A unique color filter in each of these optical axes changes the color composition from the broad spectrum originally introduced to the color extremes sought for analysis. A means is then provided for commingling these two beams back into a single beam.

This single beam contains luminous energy characterized by its color composition, spatially related luminous intensity variations, and polarizations. When the variable contrast pattern is periodic and has a space average luminance level equal to one half the sum of the maximum and minimum luminance levels, a spatial translation of one pattern with respect to the other, by a distance equal to one half the pattern wavelength, brings the photometric luminance of the single beam to a constant, uniform value across the image.

Interposed into the path of this uniform luminance level beam is a rotating linear polarizer, which can be oriented at diverse angles to the previously noted orthogonal polarizers. Rotating this polarizer into alignment with the polarizer in the path of the luminous energy source having the variable contrast pattern, permits the transmission of a uniform intensity beam composed of contrasting colors. Alignment with the other polarizer causes the rotating polarizer to pass a beam having a uniform blend of the two colors. However, the intensity remains unchanged. At intermediate positions of the rotating polarizer, it transmits beams which are identical in luminous intensity but exhibit varying degrees of color contrast less than attained with perfect alignment of the polarizers.

Though contrast patterns which are not periodic, or lack an average transmission luminance equal to one half the sum of the maximum and the minimum luminance, can be utilized in this structure, they will not retain the photometric uniformity of patterns exhibiting both characteristics.

DETAILED DESCRIPTION

The relationships between color perception and spatial frequency in terms of their effect on detection sensitivity within the human visual system, as well as general electro-optical systems, have yet to be extensively analyzed and precisely defined. In part, the difficulty is attributable to the lack of test apparatus which are capable of maintaining constant photometric luminance while undergoing variations in color or spatial frequency. Simultaneous changes of photometric luminance with color or sparial frequency inherently bias the test result, preventing repeatability and comparability of test data.

These difficulties are particularly poignant in the arena of visual displays, which, as one versed in the contemporary technology immediately recognizes, appear in a multitude of colors. Red, yellow, green and orange are encountered with greatest frequency. Without the presence of a bright background, most are readily perceived, notwithstanding low intensity levels and characters of high spatial frequency. However, once the background is illuminated, whether that be with bright daylight or bright colored light, some characters or colors within these displays become less legible when compared to others radiating substantially equal luminous energy. Though the existence of this phenomena is recognized, the norms of the underlying physiological cause have yet to be adequately defined.

The invention disclosed herein is directed to an apparatus which allows investigators to probe the human visual system, singly or in combination with the electro-optical systems, to accurately quantify their analyses, and to establish repeatable standards of comparison. It permits the variation of colors within a pattern over regions of the CIE color chart, and changes in the pattern frequency while maintaining a constant, uniform level of photometric luminance across the whole test pattern. The threshold at which color distinctions are perceived is one of many visual characteristics sought. Use of the apparatus to define standards is another clearly recognized application.

Figure 1:
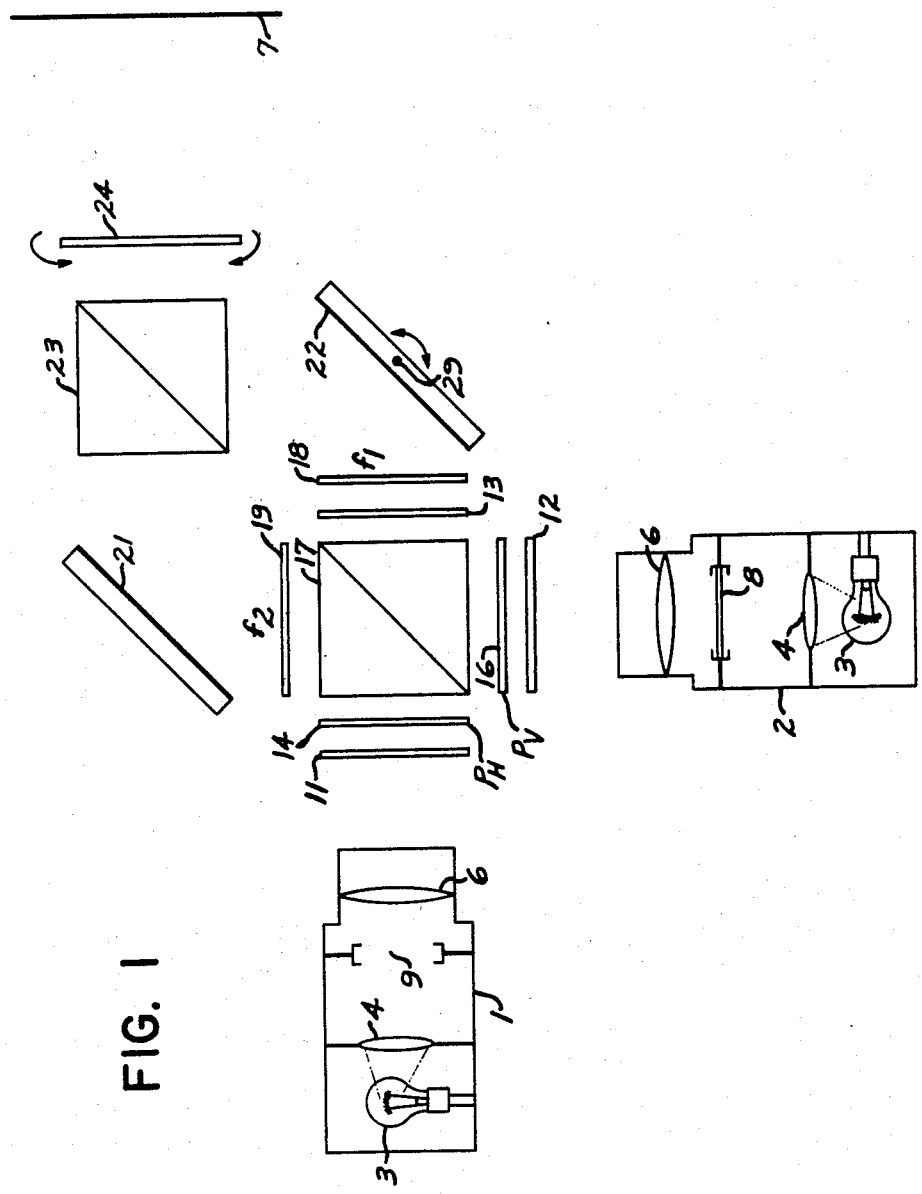
FIG. 1 is a schematic depiction of a preferred embodiment.

Attention is now directed to FIG. 1, where the invention appears embodied in a preferred apparatus. As depicted, the apparatus lies in the plane of the drawing with substantially identical projectors 1 and 2 orthogonally oriented. Each projector has a broad spectrum, white light, incandescent bulb, 3, a condensing lens, 4, and a projection lens, 6. Since both projectors generate images at viewing screen 7, they are structurally similar to conventional slide projectors. Projector 2 is shown to contain target slide 8 in the path of the light beam created therein, while projector 1 merely contains aperture 9 of comparable size.

The luminous energy, patterned or otherwise, leaving each projector passes through a succession of functional elements, which in certain cases can be interchanged or eliminated by relocating the contributed effects. Examples of the latter form are neutral density luminance balancing filters 11, 12 and 13. These filters are selected to obtain equal magnitudes of average luminance at screen 7 irrespective of transmission path losses. In optical alignment with projectors 1 and 2, and filters 11 and 12, are linear polarizers 14 and 16. As noted hereinbefore, corresponding filters and polarizers are interchangeable as to position. As embodied, polarizers 14 and 16 are oriented to polarize orthogonally.

The attenuated and polarized luminous energy beams are divided into substantially equal parts by corner cube type beam splitter 17. The same splitter commingles the beam parts into two new beams. The beams leaving splitter 17 consist of equal mixes of pattern and nonpatterned luminous energy, each of these beam parts being distinctly polarized. The mixed beams pass through color filters 18 and 19, whereafter they are reflected by mirrors 21 and 22.

To compensate for unequal attenuation in color filters 18 and 19, neutral density luminance balancing filter 13, of selected magnitude, is placed in optical series with color filter 18. Attenuating filters 11 and 12 correct for intensity imbalances between the projectors, in addition to providing attenuation to compensate for the losses attendant the opaque regions in target slide 8. Though this embodiment is shown with three distinct balancing filters, 11, 12 and 13, not all may be necessary. Their number and locations are variable so long as the photometric luminance from each projector, detected at screen 7, is equal in average value.

The angle of incidence by which the luminous energy beam leaving splitter 17 strikes mirror 21 is approximately 45 degrees. The orientation of mirror 22 is similar, excepting a small deviation which shifts the spatial distribution of luminous energy in a manner described with particularity hereinafter. The beams reflected off mirrors 21 and 22 enter a second beam splitter, 23, where they are combined. However, the output from corner cube type beam splitter 23 is not a single beam, but rather, two orthogonal beams each of half the total amplitude. For purposes of this embodiment one is discarded while the remaining is directed toward rotating polarizer 24.

Rotating polarizer 24 is substantially identical to polarizers 14 and 16, being that it is linear and is positioned in a plane perpendicular to the axis of the incident beam. As its name implies, it is rotatable in its plane between a polarization aligned with polarizer 14 and an alignment with polarizer 16.

Figure 2:
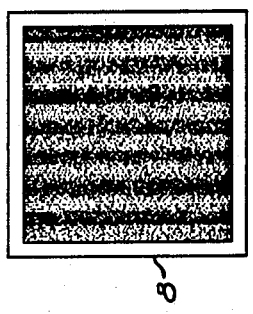
FIG. 2 schematically shows the sinusoidal contrast grating of a target slide.

For this embodiment, target slide 8 has a grating-like pattern whose contrast between adjacent grating lines varies sinusoidally as to magnitude. The pattern and contrast variation are visible on the target slide depicted in FIG. 2. Though a sinusoidal grating is a preferred configuration, other shapes and contrast variation rates are contemplates. Contrast patterns which can be characterized as being both periodic and having a space average luminance equal to half the sum of the maximum and minimum luminance are capable of maintaining constant photometric luminance while color contrast is varied. Though other patterns lacking these characteristics could be used in this apparatus, they would be unable to maintain a constant photometric luminance level as color contrast is varied.

Figure 3:
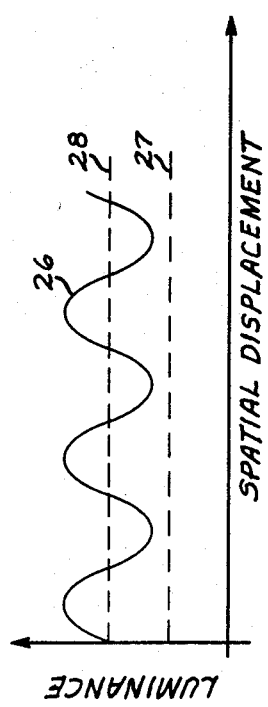
FIG. 3 is a plot of luminance verses displacement for the split beam.

Consider now the luminance plot presented in FIG. 3. Recalling that attenuating filters 11, 12 and 13 balance the average luminance of the two beams reaching beam splitter 23, the luminance distribution in FIG. 3 applies equally to both such beams. Choosing either, sinusoidally varying line 26 represents the total or cumulative level of luminous energy transmitted in the beam. Undoubtedly, it is recognized that the grating pattern on target slide 8 is the cause for the sinusoidal variation. Level 27 in the plot corresponds to that portion of the total contributed by projector 1, while the remainder, having an equal average as measured between levels 27 and 28, is attributable to projector 2. Coincidently, the failure of sinusoidally varying line 26 to descend to level 27 indicates that the grating embodied in this apparatus does not attenuate a full 100% at any point. The relevance of this target slide characteristic in terms of color will become apparent when the interaction of the beams entering splitter 23 is described hereafter. At the point of entering splitter 23 the two beams are identical in luminous intensity, spatial frequency and polarization. However, each contributing beam is distinct in its color composition.

Mirror 22 in FIG. 1 is shown to have a vertical axis, 29, about which the mirror is movable. The grating pattern on target slide 8 is aligned to be in parallel with rotation axis 29. Rotating mirror 22 translates the location of the beam peaks and troughs within splitter 23. Translating this beam by a distance of $\lambda/2$, in terms of its spatial frequency, shifts the phase of one beam relative to the other beam entering splitter 23 by 180°. Though the color composition of each beam remains unchanged, the sum of the two beams, in terms of photometric luminous energy, becomes a constant value.

Assume for purposes of the ensuing four paragraphs that rotating polarizer 24 is not present. Thus, the portion of the combined beam normally projecting through it is focussed directly onto screen 7. The amplitudes, spatial distribution and color composition of the luminous energy reaching the screen is shown in the plots forming FIG. 4. Levels or regions attributable to color filters $f_1$ and $f_2$ are generally designated. Similarly, sections of the luminous energy having distinct polarizations are generally designated by V and H, representing, respectively, the effects of vertical polarizer $P_V$, element 16, and horizontal polarizer $P_H$, element 14.

Figure 4:
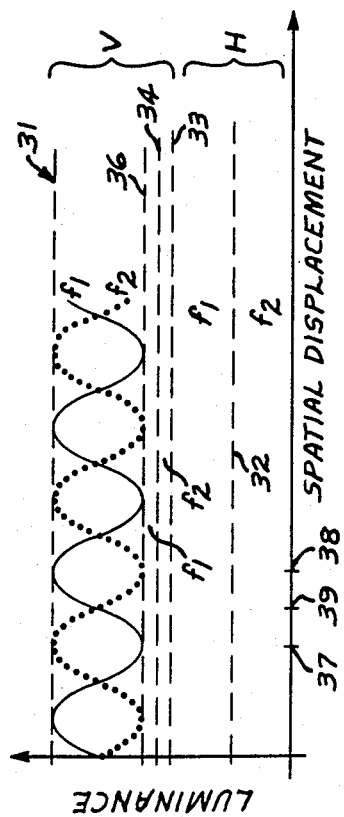
FIG. 4 shows the individual elements of luminous energy forming the combined beam.

The interrelationships of components and function are most clearly presented by analyzing the luminous energy constituents forming the image on screen 7. Level 31 in FIG. 4 represents the total photometric luminance on screen 7. Clearly, it is uniform and constant spatially. With the embodying apparatus it is fixed temporally, though modifications, fully contemplated, might dictate time related variations.

The cumulative photometric luminance represented by level 31 is composed of six parts, distinguishable in polarization, color composition or spatially related variations. The first level, 32, and the succeeding region between levels 32 and 33, are the result of luminous energy generated in projector 1, which upon being split into two separate beams undergoes filtering by $f_2$ and $f_1$, respectively. Both are horizontally polarized. The succeeding steps, reaching levels 34 and 36, represent luminous energy generated in projector 2 which, though subjected to spatial modulation by target slide 8, are never completely attenuated in the opaque areas. These residual unmodulated levels are present in the plot of FIG. 3, represented by the band between level 27 and the minimum excursion of plot 26. Each of the two levels in FIG. 4 is designated by its respective color filter.

The upper region of FIG. 4, lying between lines 36 and 31 represents the color modulated luminous energy. As was noted previously, the sum amplitude remains constant. However, the two contributors, filtered by $f_1$ and $f_2$, vary in amplitude as a sinusoidal function of the spatial displacement. The distances between line 36 and the sinusoidal waveshapes designated $f_1$ and $f_2$ are measures of the luminous intensity contributed by projector 2 after modulation by target slide 8 and filtering by color filters $f_1$ and $f_2$. Equal magnitudes of luminance between the two levels distinguishable by their polarization, and between the two spatially modulating waveforms, indicates an appropriate selection of balancing filters 11, 12 and 13. Note the shifted phase relationship of the modulated color plots designated $f_1$ and $f_2$.

Figure 5:
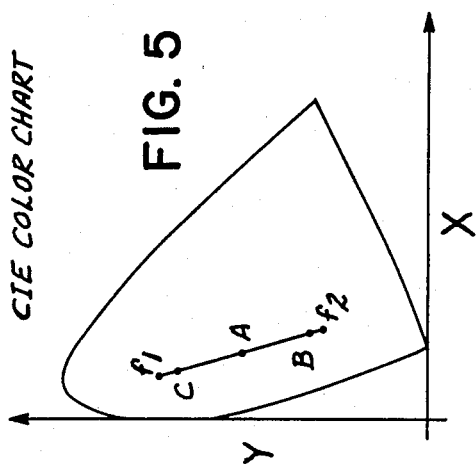
FIG. 5 contains a standard CIE color chart with a plot of color variation superimposed.

At this point in the description, rotating polarizer 24 is reintroduced into the beam directed at screen 7, a beam composed of luminous energy distinguishable on the basis of polarization, color composition and spatial distribution. Recalling that polarizer 24 is capable of revolving in a plane perpendicular to this beam, assume it is at the polarization extreme where horizontal polarizer $P_H$ is aligned while vertical polarizer $P_V$ is orthogonal. Since the plot on FIG. 4 contains all the luminous energy leaving splitter 23 directed at screen 7, and the vertical polarization of the beam is now completely attenuated, the amplitude and composition of the beam reaching screen 7 is that defined by level 33 in FIG. 4. The two components of color are equal in both magnitude and distribution, generating a homogeneous color blend. Referring to a standard CIE color chart of the form depicted in FIG. 5, the color is that of midpoint A between the extremes established by $f_1$ and $f_2$. The amplitude of luminance, level 33, is the sum of the two contributors.

Now consider the other extreme in orientation of rotating polarizer 24, namely an alignment to vertical polarizer $P_V$. Recognizing that the horizontally polarized luminous energy lying below level 33 is completely attenuated, the beam reaching screen 7 is comprised of the luminance between level 33 and 31. Between levels 33 and 36 lie two small but constant amplitude bands of luminous energy, each characterized by its color composition. The succeeding band, between levels 36 and 31, is simularly constant in total amplitude. However, the color of the constituents forming this band vary sinusoidally.

For instance, at location 37 the contribution of $f_1$ filtered color is limited to the band between levels 34 and 36. On the other hand, luminous energy of $f_2$ filter composition at location 37 has a luminance equal to the sum of the band between 33 and 34 and the full extent of the band between levels 36 and 31. In terms of the dominant color as reflected in a CIE color chart, this corresponds to point B adjacent the $f_2$ filtered color.

Next, consider spatial displacement position 38. At this point the color composition is reversed, making $f_1$ the dominant color. The color created corresponds to location C in the CIE color chart.

The final location to be considered corresponds to point 39 in FIG. 4. Recalling that only the vertical polarization is present, it is clear that the beam contains both colors in equal magnitudes. The two bands lying between levels 33 and 36 are equal, as well as the sinusoidally varying constituents. Thus, the color is again designated by midpoint location A in FIG. 5.

Notwithstanding these variations in the color it is evident from FIG. 4 that the luminance amplitude remains constant at all locations. Stated otherwise, with polarizer 24 vertically aligned the image at screen 7 is constant in photometric luminance with a grating-like pattern which varies sinusoidally in color composition between colors B and C of the CIE color chart.

As one might recognize, the separations between points $f_1$ and C, and $f_2$ and B, are the result of color blending from luminous energy in the two vertically polarized bands between levels 33 and 36.

Having shown that it is possible to create sinusoidally varying color patterns while retaining constant photometric luminance, attention now focusses on altering this color contrast without changing the photometric luminance. Consider positions of rotating polarizer 24 at angles other than vertical or horizontal. As was noted hereinbefore, the vertically and horizontally polarized constituents of the luminous energy leaving beam splitter 23 are made equivalent in amplitude by selective attenuators 11, 12 and 13. By Malus's law governing the transmission of unpolarized light through crossed polarizers, one recognizes that the absolute amplitude of luminous energy reaching screen 7 is related to the orientation of rotating polarizer 24 with respect to fixed polarizers 14 and 16. To analyze that relationship, vertical polarizer 16 is chosen as a reference with angular excursions in terms of $\theta$. According to Malus:

$$L \alpha L_V \cos^2 \theta,$$

where $L_V$ is the maximum intensity, at $\theta=0$, of vertical polarization. For the horizontal polarization, the corresponding relationship is described as:

$$L \alpha L_H \cos^2(\theta + 90°),$$

where $L_H$ is the maximum intensity of horizontal polation. The sum of the vertical and horizontal components reaching screen 7 is:

$$L_{total} \alpha L_V \cos^2 \theta + L_H \cos^2(\theta + 90°).$$

By trigonometric identity the relationship can be rewritten as:

$$L_{total} \alpha L_V \cos^2 \theta + L_H \sin^2 \theta.$$

Recognizing from FIG. 4 and the foregoing description that the vertical and horizontal components of luminance are equal upon leaving splitter 23, it can be written that:

$$L_{total} \alpha L_{V/H} (\cos^2 \theta + \sin^2 \theta).$$

$$L_{total} \alpha L_{V/H}.$$

The important point to note is the independence of luminance from rotation position $\theta$.

Taking cognizance of the spatially defined color composition variations in FIG. 4, and the independence of the luminous energy amplitude from rotation angle $\theta$, one recognizes the flexibility of the central feature underlying the invention. Irrespective of the position of rotating polorizer 23 the photometric luminance reaching screen 7 remains constant. As the angle of the polarizer is changed, the color composition on the screen changes between one extreme having a balanced blend of the two colors, to the other extreme in which the colors vary spatially in a periodic, sinusoidal pattern.

Though shown and described with reference to a distinct embodiment, the concepts upon which the invention relies are significantly broader. One focus for such variations is the composition of target slide 8. As presently embodied, it contains grating patterns whose contrast amplitude varies sinusoidally with displacement. Undoubtedly, the spatial frequency of the grating pattern is one parameter readily amenable to variation. Nonsinusoidal periodic variations in contrast, such as square waves or triangular waves, are also contemplated.

A further digression from the strict teachings of the above-described embodiment contemplates target slides whose variation in pattern is not restricted to a single direction. A simple example is the checkerboard pattern, a two dimensional counterpart of the square wave grating. Other patterns are feasible. However, if the level of photometric luminance is to be maintained uniform and constant irrespective of the color contrast, the target slide patterns must be periodic and must also have an average transmitted luminance equal to one half the sum of the maximum and minimum luminance levels.

The foregoing restriction on pattern shapes is consistent with retaining a uniform level of luminance while varying the patterns color composition. If moderate changes in luminance, concurrent with changes in color, are acceptable, the periodicity and average value constraints on the pattern composition no longer apply.

These and other embodiments of the invention as it is defined by the concepts disclosed herein fall within the scope and spirit of the claimed invention.

I claim:

1. An apparatus for creating a visual test pattern in which color contrast is variable while photometric luminance remains substantially constant, comprising:
   a first projecting beam of broad spectrum luminous energy, said beam being substantially uniform in intensity;
   a second projecting beam of broad spectrum luminous energy, said second beam containing a spatially variable intensity pattern;
   a means for polarizing said first and second beams;
   a means for splitting each beam and coaxially interleaving the segments;
   a pair of color filters, one in the path of each beam containing interleaved segments;
   a means for altering the relative spatial phase of the beams containing interleaved segments;
   a means for combining the beams containing interleaved segments into a single coaxial beam; and
   a movable polarizer in the path of said single coaxial beam.

2. The apparatus recited in claim 1, wherein the first and second projecting beams are orthogonal, said means for polarizing the beams are orthogonal as to polarization, and the means for splitting and combining beams are corner cube type beam splitters.

3. The apparatus recited in claims 1 or 2, wherein the spatially variable intensity pattern in said second beam is periodic and has a space average luminance level equal to one half the sum of the maximum and minimum luminance levels, and further wherein the means for altering the relative phase reverses the phase by translating one beam containing interleaved segments relative to the other.

4. The apparatus recited in claim 3, wherein the spatially variable intensity pattern is a grating and the means for altering the relative phase is a pivoted mirror whose axis of rotation is parallel to the grating direction, and which contains neutral density luminous balancing filters in the paths of the various beams to equalize the luminance levels associated with the polarizations when measured at the exit of the combining means.

* * * * *